United States Patent
Serizawa et al.

(10) Patent No.: US 11,404,694 B2
(45) Date of Patent: Aug. 2, 2022

(54) RESIN COMPOSITION

(71) Applicant: NEC Corporation, Tokyo (JP)

(72) Inventors: Shin Serizawa, Tokyo (JP); Kazuhiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/760,477

(22) PCT Filed: Sep. 16, 2016

(86) PCT No.: PCT/JP2016/077524
§ 371 (c)(1),
(2) Date: Mar. 15, 2018

(87) PCT Pub. No.: WO2017/047778
PCT Pub. Date: Mar. 23, 2017

(65) Prior Publication Data
US 2018/0248192 A1    Aug. 30, 2018

(30) Foreign Application Priority Data

Sep. 17, 2015  (JP) .............................. JP2015-184530
Nov. 9, 2015   (JP) .............................. JP2015-219948

(51) Int. Cl.
*H01M 4/62* (2006.01)
*H01M 10/05* (2010.01)
(Continued)

(52) U.S. Cl.
CPC ........ *H01M 4/622* (2013.01); *C08G 73/1021* (2013.01); *C08G 73/1042* (2013.01);
(Continued)

(58) Field of Classification Search
None
See application file for complete search history.

(56) References Cited

U.S. PATENT DOCUMENTS 5,585,217 A * 12/1996 Oba .................. C08G 73/1007
430/170
5,753,407 A * 5/1998 Oba .................. C08G 73/1007
430/170
(Continued)

FOREIGN PATENT DOCUMENTS

JP    7-138479 A    5/1995
JP    H07138479  *  5/1995  ............... C08K 5/09
(Continued)

OTHER PUBLICATIONS

International Search Report for PCT/JP2016/077524 dated Nov. 22, 2016 [PCT/ISA/210].
(Continued)

*Primary Examiner* — Barbara L Gilliam
*Assistant Examiner* — Angela J Martin
(74) *Attorney, Agent, or Firm* — Sughrue Mion, PLLC

(57) ABSTRACT

An object of the present invention is to provide a polyimide binder which can be prepared under lower temperature conditions. The binder composition for a secondary battery of the present invention is characterized in comprising a polyamic acid and an aromatic compound comprising an electron donating group and an organic acid group.

20 Claims, 1 Drawing Sheet

(51) Int. Cl.
| | | |
|---|---|---|
| *H01M 4/36* | (2006.01) | |
| *H01M 4/13* | (2010.01) | |
| *C08G 73/10* | (2006.01) | |
| *C08G 73/14* | (2006.01) | |
| *H01M 10/0525* | (2010.01) | |
| *C08L 79/08* | (2006.01) | |

(52) U.S. Cl.
CPC ..... *C08G 73/1046* (2013.01); *C08G 73/1053* (2013.01); *C08G 73/1071* (2013.01); *C08G 73/1082* (2013.01); *C08G 73/14* (2013.01); *H01M 4/13* (2013.01); *H01M 10/0525* (2013.01); *C08L 79/08* (2013.01); *H01M 4/366* (2013.01)

(56) References Cited

U.S. PATENT DOCUMENTS

| | | | |
|---|---|---|---|
| 6,811,577 B2 | 11/2004 | Fujimatsu et al. | |
| 2009/0297869 A1* | 12/2009 | Gomi | B32B 37/00 |
| | | | 428/448 |
| 2010/0221965 A1* | 9/2010 | Katayama | H01G 9/155 |
| | | | 442/59 |
| 2015/0228982 A1* | 8/2015 | Shibano | H01G 11/36 |
| | | | 429/245 |

FOREIGN PATENT DOCUMENTS

| | | | |
|---|---|---|---|
| JP | 2002-8664 A | 1/2002 | |
| JP | 2002-083590 A | 3/2002 | |
| JP | 2003-292776 A | 10/2003 | |
| JP | 2004-253348 A | 9/2004 | |
| JP | 2006-16592 A | 1/2006 | |
| JP | 2007-95670 A | 4/2007 | |
| JP | 2008-84562 A | 4/2008 | |
| JP | 2008-135384 A | 6/2008 | |
| JP | 2011-76901 A | 4/2011 | |
| JP | 2012-129068 A | 7/2012 | |
| JP | 2013-67769 A | 4/2013 | |
| JP | 2013-197069 A | 9/2013 | |
| JP | 2013-229160 A | 11/2013 | |
| JP | 2014-186997 A | 10/2014 | |
| JP | 2014186997 * | 10/2014 | ............ C08G 73/10 |
| WO | 2004/004031 A1 | 1/2004 | |
| WO | 2009/113585 A1 | 9/2009 | |
| WO | 2010/050491 A1 | 5/2010 | |
| WO | 2012/017738 A1 | 2/2012 | |
| WO | 2014/196543 A1 | 12/2014 | |

OTHER PUBLICATIONS

Communication dated Apr. 28, 2020, from the Japanese Patent Office in Application No. 2017-540019.
Decision to Grant a Patent dated Nov. 4, 2020 by the Japanese Patent Office in counterpart application No. 2017-540019.

* cited by examiner

RESIN COMPOSITION

CROSS REFERENCE TO RELATED APPLICATIONS

This application is a National Stage of International Application No. PCT/JP2016/077524, filed on Sep. 16, 2016, which claims priority from Japanese Patent Application No. 2015-184530, filed on Sep. 17, 2015, and Japanese Patent Application No. 2015-219948, filed on Nov. 9, 2015.

TECHNICAL FIELD

The present invention relates to a binder composition for a secondary battery, an electrode mixture paste for a secondary battery, a secondary battery using them, and a manufacture method thereof.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving motorcycles and automobiles and storage cells for smart grids, have attracted attention. As demand for lithium ion secondary batteries are increased and batteries are used in more various fields, characteristics such as a further enhancement in the energy density, lifetime characteristics for endurance over long-term use, and usability in a wide range of temperature condition are demanded.

Carbon materials are generally used in negative electrodes of the lithium ion secondary batteries, but it is examined to use silicon-based materials having large capability of absorbing and releasing lithium ions in the negative electrodes to enhance the energy density of the battery. However, there is a problem in that the silicon-based materials expand and contract by repeating charge and discharge of the lithium, and thereby, the active material layer is damaged and peels off from the current collector to deteriorate the cycle characteristics of the battery.

It is known to use a polyimide resin excellent in mechanical strength as a binder in the negative electrode comprising the silicon-based material to solve this problem. Patent document 1 discloses that the cycle characteristics of the batteries are improved with a binder having the mechanical characteristics of a tensile strength of 50 N/mm$^2$ or more, an elongation at break of 10% or more, a strain energy density of 2.5×10$^{-3}$ J/mm$^3$ or more and a coefficient of elasticity of 10000 N/mm$^2$ or less. In addition, Patent document 1 discloses that polyimide binders have these mechanical characteristics and are preferred as a binder of the electrodes comprising the silicon-based material.

CITATION LIST

Patent Document

Patent Document 1: International Publication WO No. 2004/004031

SUMMARY OF INVENTION

Technical Problem

However, the polyimide binders having high mechanical strength, described in the above prior art document, are obtained by heat-treating a polyamic acid in an electrode mixture paste, and in this heat treatment, the electrode mixture paste has to be exposed to high temperature such as 400° C. This is because the reaction from polyamic acid to polyimide does not proceed in the heat treatment at low temperature, causing problems such as that cycle characteristics of the produced battery decrease. The heat treatment at high temperature increases the manufacturing cost of the battery and requires heating equipment to expose the electrodes to high temperature conditions, and thereby, the heat treatment at lower temperature has been desired.

An object of the present invention is to provide a binder composition for a secondary battery for lowering temperature in the heat treatment of the polyimide binder, which is the above mentioned problem.

Solution to Problem

The binder composition for a secondary battery of the present invention comprises a polyamic acid and an aromatic compound comprising an electron donating group and an organic acid group.

Advantageous Effect of Invention

According to the binder composition for a secondary battery of the present invention, it is possible to provide a polyimide binder capable of providing excellent cycle characteristics to the produced battery even if the heat treatment is conducted at lower temperature. In addition, the present binder can be used as a resin composition not only for a secondary battery but also for an adhesive and a molded product. That is, according to the present resin composition or the resin composition further comprising filler, a polyimide resin which can be prepared by the heat treatment at lower temperature can be provided.

Figure 1:
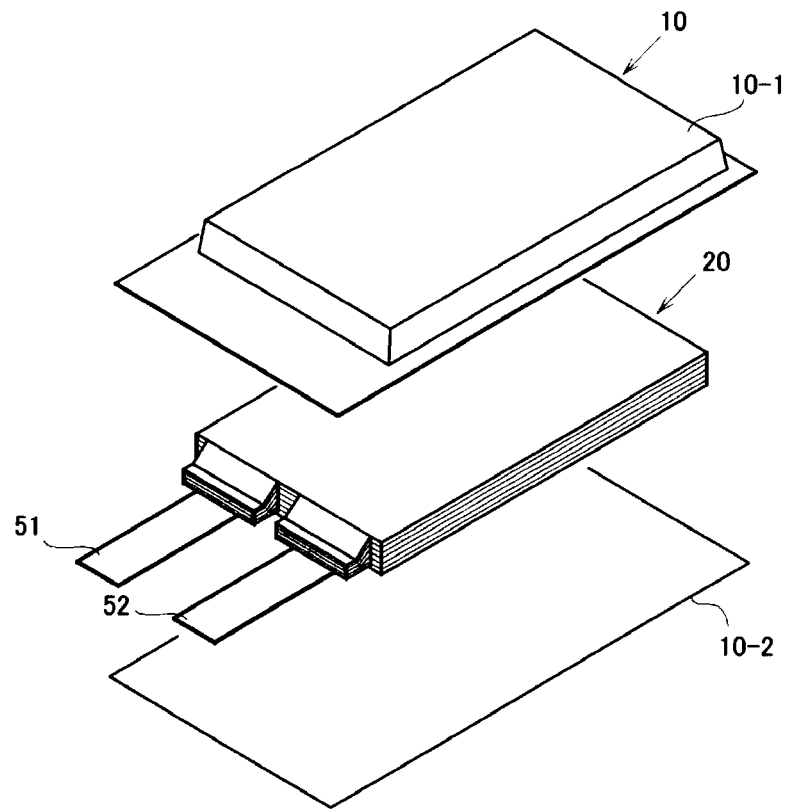
FIG. 1 is a schematic diagram showing an example of the present invention.

DESCRIPTION OF EMBODIMENTS (1) Binder Composition for Secondary Battery

In the present embodiment, the binder composition for a secondary battery comprises a polyamic acid and an aromatic compound comprising an electron donating group and an organic acid group. This binder composition for a secondary battery is a polyimide binder. Herein, the description, "polyimide" may include not only polyimides but also polyamide-imides.

Polyamic Acid

The polyamic acid is obtained by polymerizing a tetracarboxylic dianhydride or a tolycarboxylic anhydride and a diamine. Therefore, the polyamic acid comprises a unit consisting of a structure based on the tetracarboxylic dianhydride or the tolycarboxylic anhydride and a structure based on the diamine. These two structures condense through an amide bond to form a polyamic acid.

The structure based on the tetracarboxylic dianhydride is preferably based on a compound in which two carboxylic anhydride groups directly bond to an aromatic ring(s), and especially, more preferably based on the compound in which the aromatic ring is benzene. More specifically, the structure is preferably based on a compound selected from 3,3',4,4'-biphenyltetracarboxylic dianhydride, pyromellitic dianhydride, 3,4'-oxydiphthalic anhydride, 4,4'-oxydiphthalic anhydride, 3,3',4,4'-benzophenonetetracarboxylic dianhydride, and the like. The polyamic acid comprising the structure based on the tetracarboxylic dianhydride can be converted to a polyimide by the heat treatment.

The structure based on the tolycarboxylic anhydride is preferably based on a compound in which a carboxylic anhydride group and a carboxyl group are directly bonded to an aromatic ring(s), and especially, more preferably the compound in which the aromatic ring is benzene. More specifically, the structure is preferably based on a compound selected from trimellitic anhydride, 3',4,4'-biphenyltricarboxylic anhydride, 3',4,4'-diphenyl methane tricarboxylic anhydride, and the like. The polyamic acid comprising the structure based on the tolycarboxylic anhydride can be converted to a polyamide-imide by the heat treatment.

The structure based on the diamine is preferably based on a compound selected from aliphatic diamines, alicyclic diamines, aromatic diamines, and the like. More specifically, the structure is based on a compound selected from 1,3-bis(aminomethyl)cyclohexane, 1,4-bis(aminomethyl)cyclohexane, 4,4'-diaminodiphenyl ether, 3,4'-diaminodiphenyl ether, p-phenylenediamine and the like. The diamine also includes 1,4-diaminocyclohexane, 4,4'-diaminodiphenyl ether, 4,4'-diaminodiphenyl methane, and the like.

Aromatic Compound

The aromatic compound comprises an electron donating group and an organic acid group. The electron donating group only needs to be a group having a negative Hammett substituent constant when it is substituted at the para position of benzoic acid. Examples of the electron donating group include alkyl group, alkoxy group, amino group, hydroxyl group, mercapto group, alkylthio group, and the like. Among them, alkyl group and hydroxyl group are particularly preferred, and hydroxyl group is most preferred. The number of the electron donating groups present in the aromatic compound may be one or more. Preferably, the number of the electron donating group is one.

Examples of the organic acid group include carboxyl group, sulfo group, and phosphate group. Among them, carboxyl group is particularly preferred. The number of the organic acid groups present in the aromatic compound may be one or more, preferably one or two, and most preferably one. When the organic acid groups are present in the aromatic compound in excess, they react with the polyamic acid three dimensionally and gel in some cases. To prevent this, it is preferable to set the number of the organic acid groups in the aromatic compound to two or less. When two or more of the organic acid groups are present in the aromatic compound, the organic acid groups are preferably substituted at positions away from each other, for example, in meta relation, para relation or the like in the case of benzene ring. It becomes possible to prevent the organic acid groups of the aromatic compound from condensing each other in the molecule by arranging the organic acid groups at positions away from each other.

Preferred aromatic compounds are those in which hydrogens of the aromatic ring(s) have been directly substituted with the electron donating group and the organic acid group. Examples of the aromatic ring skeleton include benzene, biphenyl, naphthalene and the like. Among them, benzene has a low molecular weight and is preferred for increasing the energy density of the battery.

Examples of the preferred aromatic compound include hydroxybenzoic acid, aminobenzoic acid, alkylbenzoic acid, mercaptobenzoic acid, alkoxybenzoic acid, alkylthiobenzoic acid, hydroxybiphenyl carboxylic acid, aminobiphenyl carboxylic acid, alkylbiphenyl carboxylic acid, mercaptobiphenyl carboxylic acid, alkoxybiphenyl carboxylic acid, alkylthiobiphenyl carboxylic acid, hydroxylnaphthalenecarboxylic acid, aminonaphthalenecarboxylic acid, alkylnaphthalenecarboxylic acid, mercaptonaphthalenecarboxylic acid, alkoxynaphthalenecarboxylic acid, alkylthionaphthalenecarboxylic acid, and the like. The substitution positions of the electron donating group and the organic acid group in these compounds are not limited, but the compounds in which the electron donating group and the organic acid group are substituted at positions away from each other are more preferred. When the skeleton of the aromatic compound is benzene, the compounds in which the electron donating group and the organic acid group are in meta relation or para relation, and especially para relation with each other are preferred. When the skeleton of the aromatic compound is biphenyl, the compounds in which the electron donating group and the organic acid group are at 4,4' position, 3,4' position, or 3,3' position, and especially 4,4' position are preferred. When the skeleton of the aromatic compound is naphthalene, the compounds in which the electron donating group and the organic acid group are at 2,6 position, 2,7 position, or 2,4 position, and especially 2,6 position are preferred.

The amount of the aromatic compound in the binder composition for a secondary battery is preferably 60 mass % or less, and more preferably 30 mass % or less, based on the mass of the polyamic acid. In addition, the amount of the aromatic compound in the binder composition for a secondary battery is preferably 0.01 mass % or more, and more preferably 0.1 mass % or more, based on the mass of the polyamic acid. The polyamic acid is commercially available as a solution in some cases, but herein, the mass of the polyamic acid does not include the mass of other components than the polyamic acid such as solvents.

More specifically, the reactivity of the aromatic compounds varies depending on the electron donating group and the organic acid group, and therefore, the preferred amount varies depending on the aromatic compound. For example, there are some cases where the amount of the aromatic compound in the binder composition for a secondary battery is preferably 20 mass % or less, and more preferably 10 mass % or less, based on the mass of the polyamic acid. For example, there are some cases where the amount of the aromatic compound in the binder composition for a secondary battery is preferably 6 mass % or less, and more preferably 3 mass % or less, based on the mass of the polyamic acid. In addition, there are some cases where the amount of the aromatic compound in the binder composition for a secondary battery is preferably 0.5 mass % or more, and more preferably 1.5 mass % or more, based on the mass of the polyamic acid.

When the binder composition for a secondary battery comprises the aromatic compound, the reaction from polyamic acid to polyimide can proceed even by the heat treatment at low temperature. In particular, the reaction from polyamic acid to polyimide can be further promoted with a preferable content of the aromatic compound. For this reason, the binder has high bonding strength even in the case of the heat treatment at low temperature, and the cycle characteristics of the produced battery are improved. Therefore, the binder composition for a secondary battery according to the present invention is preferably used as a binder for a negative electrode and/or positive electrode, and more preferably for a negative electrode, of the secondary battery.

(2) Electrode Mixture Paste for Secondary Battery and Battery Using Electrode Mixture Paste for Secondary Battery An electrode mixture paste for a secondary battery to apply on a current collector of the secondary battery can be prepared from the binder composition for a secondary battery. An electrode can be produced by applying this electrode mixture paste for a secondary battery on a current collector, and a secondary battery can be further produced from this electrode. The binder composition for a secondary battery can be used in either a negative electrode or positive electrode, but the embodiment in which the binder composition for a secondary battery is used in a negative electrode will be described hereafter as one aspect of the embodiment.

Electrode Mixture Paste for Secondary Battery

The electrode mixture paste for a secondary battery comprises the binder composition for a secondary battery and an active material. Preferably, the electrode mixture paste for a secondary battery further comprises a solvent and is a slurry. The active material is a material capable of reversibly intercalating and deintercalating lithium ions according to charge and discharge, and preferable examples thereof include negative electrode active materials, such as metals, metal oxides, and carbon materials.

Examples of the metal include Li, Al, Si, Pb, Sn, In, Bi, Ag, Ba, Ca, Hg, Pd, Pt, Te, Zn, La, alloys of two or more of these and the like. Alternatively, it may be used by mixing two or more of these metals and alloys. These metals and alloys may comprise one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material of the metal oxide, and silicon oxide is more preferably contained. This is because silicon oxide is relatively stable and is unlikely to trigger a reaction with other compounds. Also, for example, 0.1 to 5 mass % of one or two or more elements selected from nitrogen, boron, and sulfur can be added to the metal oxide. In this way, the electroconductivity of the metal oxide can be enhanced.

Examples of the carbon materials include graphite, amorphous carbon, graphene, diamond-like carbon, carbon nanotube, and composites thereof. Here, highly crystalline carbon is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

In order to make use of the high mechanical strength of the binder composition for a secondary battery according to the present invention, it is preferable to use an active material with large expansion and contraction during charging and discharging among these negative electrode active materials. Examples of the active material with large expansion and contraction include Si, Sn, silicon oxide, and tin oxide. Silicon oxide is particularly preferred. This is because it is possible to make use of the advantage due to the polyimide binder of preventing active material layers from breaking and peeling off from the current collector of the battery due to the expansion and contraction. In addition, a lithium ion secondary battery excellent in energy density can be provided with these active materials.

In order to improve battery properties such as cycle characteristics, the electrode mixture paste for a secondary battery may comprises another negative electrode active material in combination with the negative electrode active material with large expansion and contraction during charging and discharging. For example, it is preferable to use Si or silicon oxide in combination with the carbon material such as graphite. In addition, coated particles may be used as an active material to prevent damage due to contact between active materials caused by the expansion and contraction. For example, Si or silicon oxide coated with a carbon material such as graphite may be used.

With respect to the ratio of the negative electrode active material and the polyamic acid contained in the binder composition for a secondary battery, from the viewpoint of the binding strength and energy density that are in trade off relation with each other, the amount of the polyamic acid is preferably 0.5 to 50 parts by mass, and more preferably 0.5 to 30 parts by mass, based on 100 parts by mass of the negative electrode active material. Polyamic acid is commercially available as a solution in some cases, but the mass of the polyamic acid here does not include the mass of other components than the polyamic acid such as solvents.

Examples of the solvent contained in the electrode mixture paste for a secondary battery include conventional solvents used for polyamic acid binders. Examples of the nonaqueous solvent include dimethylformamide, N-methylpyrrolidone, and the like. In addition, the solvent may comprise water.

For the electrode mixture paste for a secondary battery, a conductive assisting agent may be added for the purpose of lowering the impedance. Examples of the conductive assisting agent include, flake-like, soot, and fibrous carbon fine particles and the like, for example, carbon black, acetylene black, ketjen black, vapor grown carbon fibers and the like.

Negative Electrode

The negative electrode may be produced by applying the electrode mixture paste for a secondary battery onto a negative electrode current collector and heat-treating it. Examples of the method of applying the electrode mixture paste for a secondary battery include a doctor blade method, a die coater method, a CVD method, a sputtering method, and the like.

As the negative electrode current collector on which the electrode mixture paste for a secondary battery is applied, from the view point of electrochemical stability, aluminum, nickel, copper, silver, iron, chromium, molybdenum and alloys thereof are preferred. As the shape thereof, foil, flat plate, mesh and the like are exemplified.

The negative electrode can be produced by applying the electrode mixture paste for a secondary batter onto the negative electrode current collector and then carrying out the dehydration/cyclization reaction from polyamic acid to polyimide by the heat treatment. The reaction from polyamic acid to polyimide can proceed at lower temperature with the aromatic compound comprising the electron donating group and the organic acid group in the binder composition for a secondary battery or the electrode mixture paste for a secondary battery according to the present invention. The heat treatment temperature is preferably lower than 200° C., more preferably 180° C. or lower, still more preferably 150° C. or lower, and most preferably 130° C. or lower. In addition, in order to promote the reaction, the heat treatment temperature is preferably 50° C. or higher, more preferably 80° C. or higher, and most preferably 90° C. or higher. The heat treatment can be carried out under any atmosphere of air, inert gas such as nitrogen, and vacuum. The time for the heat treatment depends on the temperature and the amount of the electrode mixture paste for a secondary battery, but it may be preferably 1 minute or more and 24 hours or less, and more preferably 5 minutes or more and 5 hours or less. Volatile components, such as the solvent, of the electrode mixture paste for a secondary battery may be removed by the heat treatment. After the heat treatment, a negative electrode active material layer, in which particles of residual components such as the active material contained in the electrode mixture paste for a secondary battery are bound with the polyimide binder, is formed on the current collector and a negative electrode can be obtained. After the heat treatment, there are some cases where at least a part of the aromatic compound remains in the negative electrode active material layer, maintaining its structure. A dry process by heat or vacuum may be also added before the heat treatment in order to remove the solvent contained in the electrode mixture paste for a secondary battery.

The content of the polyamic acid or polyimide in the negative electrode active material layer is preferably as small as possible within a range in which the expansion and contraction of the negative electrode active material can be suppressed from the viewpoint of high capacity. The content of the polyamic acid in the negative electrode active material layer is preferably 50 mass % or less, and more preferably 30 mass % or less. The content of the polyamic acid or polyimide in the negative electrode active material layer is preferably 0.5 mass % or more.

Positive Electrode

The positive electrode active material is not particularly limited as long as it is a material capable of absorb and desorb lithium and may be selected from some viewpoints. From the viewpoint of high energy density, it is preferable to contain a compound having high capacity. Examples of the high capacity compound include lithium nickel composite oxides in which a part of the Ni of lithium nickelate ($LiNiO_2$) is replaced by another metal element, and layered lithium nickel composite oxides represented by the following formula (A) are preferred.

$$Li_y Ni_{(1-x)} M_x O_2 \quad (A)$$

wherein $0 \leq x < 1$, $0 < y \leq 1.2$, and M is at least one element selected from the group consisting of Co, Al, Mn, Fe, Ti, and B.

It is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0 < \alpha \leq 1.2$, preferably $1\alpha \leq 1.2$, $\beta+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_x Mn_2 O_4$ ($0 < x < 2$), $Li_2 MnO_3$, and $Li_x Mn_{1.5} Ni_{0.5} O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

Examples of the positive electrode binder include polyvinylidene fluoride (PVDF), vinylidene fluoride-hexafluoropropylene copolymer, vinylidene fluoride-tetrafluoroethylene copolymer, polytetrafluoroethylene, polypropylene, polyethylene, polyimide, polyamideimide and the like. The binder composition for a secondary battery according to the present invention can be also used as the positive electrode binder. In addition to the above, styrene butadiene rubber (SBR) and the like can be used. When an aqueous binder such as an SBR emulsion is used, a thickener such as carboxymethyl cellulose (CMC) can also be used. The above positive electrode binders may be mixed and used. The amount of the positive electrode binder is preferably 2 to 10 parts by mass based on 100 parts by mass of the positive electrode active material, from the viewpoint of the binding strength and energy density that are in a trade-off relation with each other.

For the coating layer containing the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the viewpoint of electrochemical stability, aluminum, nickel, copper, silver, and alloys thereof are preferred. As the shape thereof, foil, flat plate, mesh and the like are exemplified. In particular, a current collector using aluminum, an aluminum alloy, or iron-nickel-chromium-molybdenum based stainless steel is preferable.

The positive electrode may be prepared by forming a positive active material layer comprising the positive electrode active material and the positive electrode binder. Examples of a method of forming the positive electrode active material layer include a doctor blade method, a die coater method, a CVD method, a sputtering method, and the like. It is also possible that, after forming the positive electrode active material layer in advance, a thin film of aluminum, nickel or an alloy thereof may be formed by a method such as vapor deposition, sputtering or the like to obtain a positive electrode current collector.

Electrolyte Solution

The electrolyte solution of the secondary battery according to the present embodiment is not particularly limited, but is preferably a non-aqueous electrolyte solution containing a non-aqueous solvent and a supporting salt which are stable at the operating potential of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) and the like is preferably contained.

The non-aqueous solvent may be used alone, or in combination of two or more.

Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. The supporting salts may be used alone or in combination of two or more. From the viewpoint of cost reduction, $LiPF_6$ is preferable.

The electrolyte solution may further contain additives. The additive is not particularly limited, and examples thereof include halogenated cyclic carbonates, unsaturated cyclic carbonates, cyclic or open-chain disulfonic acid esters, and the like. These compounds can improve battery characteristics such as cycle characteristics. This is presumably because these additives decompose during charge/discharge of the lithium ion secondary battery to form a film on the surface of the electrode active material to inhibit decomposition of the electrolyte solution and supporting salt.

Separator

The separator may be of any type as long as it suppresses electron conduction between the positive electrode and the negative electrode, does not inhibit the permeation of charged substances, and has durability against the electrolyte solution. Specific examples of the material include polyolefins such as polypropylene and polyethylene, cellulose, polyethylene terephthalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

Insulation Layer

Polyolefin separator has a melting point of 160° C. or lower and cannot maintain the insulation performance between electrodes under an environment at a high temperature exceeding this melting point. There is a technique that inorganic or organic insulating particles having high heat resistance are applied on an electrode surface to form an insulation layer (also referred to as insulation coating), which can maintain the insulation performance between electrodes even at a temperature of 160° C. or more. The insulation layer may be formed on a surface of the positive electrode, negative electrode, or separator. Examples of a method of forming the insulation layer include a doctor blade method, a die coater method, a CVD method, a sputtering method, and the like. The insulation layer may be formed at the same time as forming a positive electrode, negative electrode, or separator. Materials constituting the insulation layer include a mixture of aluminum oxide, barium titanate or the like and SBR or PVDF.

However, when a silicon material is used as a negative electrode active material, it expands and contracts during charging and discharging, causing cracks and peeling of the insulation layer even if the polyimide that has high strength is used. For this case, an elastomeric binder such as PVDF or SBR, which has lower strength than polyimide but which is excellent in elongation, can be used as the insulation layer binder to prevent the cracks and the peeling of the insulation layer and maintain the high insulation performance.

The elongation property can be evaluated by the elongation percentage of a test piece at break in a tensile test. In order to prevent the cracks and the peeling of the insulation layer, the elongation percentage of the insulation layer (measured in accordance with ASTM D638) is preferably 1% or more, and more preferably 3% or more. On the other hand, the elongation percentage of the insulation layer (measured in accordance with ASTM D638) is preferably 800% or less. In order to obtain such an elongation property, the content of the elastomeric binder is preferably 5 mass % or more, and more preferably 10 mass % or more of the insulation layer.

However, many of the elastomeric binders have low heat resistance. The melting point of the elastomeric binder is generally 300° C. or lower in many cases and 200° C. or lower in some cases. In addition, the decomposition point of the elastomeric binder is generally 500° C. or lower in many cases and 400° C. or lower in some cases. For example, PVDF has a melting point of 174° C., a heat resistant temperature of 260° C., and a decomposition point of 375° C. When a conventional polyimide binder is used, it is necessary to heat-treat the electrode mixture layer at a temperature of 300 to 500° C. to imidize a polyamic acid. For this reason, when the elastomeric binder with low heat resistance is used in the insulation layer, it is necessary to conduct the heat treatment for polyimide before forming the insulating layer. When the formed insulation layer is exposed to high temperature, the elastomeric binder deteriorates and melts, making the gap control of the insulation layer difficult. Therefore, there is a problem in that an efficient process for producing an electrode cannot be adopted when a polyimide binder is used in the electrode and an elastomeric binder is used in the insulation layer thereon.

The binder composition for a secondary battery of the present invention, which can make the heat-treatment temperature lower, is effective against this problem. Even when the insulation layer comprising an elastomeric binder is equipped, an electrode can be produced with the binder composition for a secondary battery of the present invention by the following manufacturing process. Firstly, a mixture layer comprising the binder composition for a secondary battery of the present invention and an insulation layer are simultaneously or continuously applied onto an electrode current collector, and secondary, the electrode is dried to remove the solvents. Then, the electrode is pressed as necessary, and finally, the heat treatment is conducted at low temperature so as not to impair the function of the elastomeric binder, and thereby, an electrode is completed. This process is advantageous in terms of manufacturing cost because the mixture layer and the insulation layer can be dried at the same time. Such a manufacturing process for an electrode may be modified as necessary. For example, for the purpose of further cost reduction, the drying of the mixture layer and/or the insulation layer and the heat treatment for the imidization may be combined to perform them as one heat process, and the dry process may be omitted.

Structure of Secondary Battery

Figure 2:
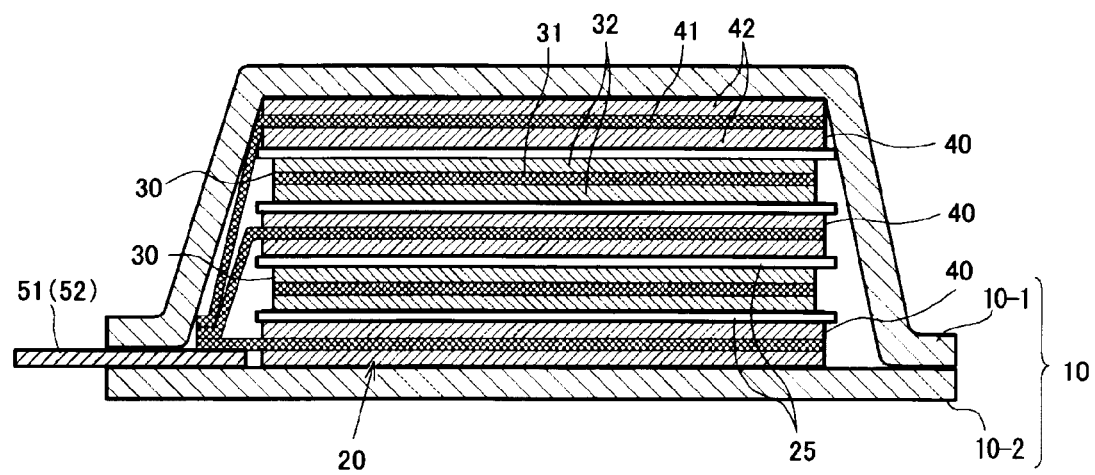
FIG. 2 is an exploded perspective view showing the basic structure of a film-packaged battery.

The secondary battery according to the present embodiment may be, for example, a secondary battery having a structure as shown in FIGS. 1 and 2. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

Method of Manufacturing Lithium Ion Secondary Battery

The secondary battery according to the present embodiment can be manufactured according to conventional method. An example of a method of manufacturing a secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

Assembled Battery

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

Vehicle

The secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, and it may be a variety of power source of other vehicles, such as a moving body like a train.

Other Use than Secondary Battery

The composition of the present invention comprising the polyamic acid and the aromatic compound comprising the electron donating group and the organic acid group can make it possible to prepare a polyimide at lower temperature than before. For this reason, according to the present invention, a polyimide can be prepared at low cost. This advantage is not limited to binders for a secondary battery. Thus, the above mentioned binder composition for a secondary battery can be also used as a resin composition which is used for other uses. Other uses are those where polyimide may be used, and examples thereof include adhesive for uses other than a secondary battery, resin molded article, fiver, film, and the like.

EXAMPLE

Examples 1 to 5 and Comparative Examples 1 and 2

Production of Electrode

A composite in which the surface of $SiO_x$ having an average particle diameter D50% of 8 μm was coated with a carbon material (the amount of the carbon material in the composite was 7 mass %), a polyamic acid solution (trade name: "U-varnish A", manufactured by Ube industries, Ltd., 20% by mass of polyamic acid), and an additive were respectively weighed at a mass ratio of 50:49:X. X was set to 0.9 in Examples 1 to 4, and X was set to 0 in Comparative examples 1 and 2. In Example 5, X was set to 2.7. These were mixed with N-methylpyrrolidone (NMP) to give a slurry. The amount of water in the slurry was 200 to 300 ppm. The slurry was applied on a copper foil having a thickness of 10 μm by using a doctor blade. Thereafter, the resultant was heated at 120° C. for 5 minutes for drying the NMP. Then, the resultant was heated at 150° C. under atmospheric pressure in air or at 125° C. under nitrogen gas (flow rate 70 L/min) for 1 hour. This copper film on which an active material layer has been formed was stamped into a circular shape having a diameter of 12 mm to produce an electrode.

Production of Battery

The produced electrode was layered with a counter electrode of Li metal via an olefinic separator to produce a model cell with EC/DEC/EMC=3/5/2 (the volume ratio) containing 1 M of $LiPF_6$ as an electrolyte solution.

Evaluation of Battery

A charge and discharge test and a cycle test of the produced model cell were performed at 25° C. In the charge and discharge test, charge and discharge were performed twice in a current density of 0.3 mA/cm$^2$ in a voltage range of 0.03 to 1.0 V. The quantity of electricity flowed from the start until the end of charging or discharging was defined as the charge capacity or the discharge capacity, and the second charge capacity (corresponding to the amount of lithium desorption from the silicon-based electrode) was defined as 1 C. The 1 C capacity per mass of the $SiO_x$ composite of the electrode (Reference example 1) treated at 350° C. for 3 hours and not comprising the additive such as p-hydroxy benzoic acid was set to 100, and thereby, the 1 C capacity ratio of the electrode was determined.

In the cycle test, the model cells after the charge and discharge test were used, and a cycle including discharging at 0.3 C to 1.0 V and carrying out constant voltage discharge for 4 hours in total and then carrying out constant current charge at 0.3 C to 0.03 V was repeated 50 times. The proportion of the discharge capacity after 50 cycles to the initial discharge capacity (corresponding to the amount of lithium desorption from the silicon-based electrode) was determined as the capacity retention ratio.

Reference Example 1

The mass ratio of the composite in which the surface of $SiO_x$ having an average particle diameter D50% of 8 μm was coated with a carbon material (the amount of the carbon material in the composite was 7 mass %) and the polyamic acid solution (trade name: "U-varnish A", manufactured by Ube industries, Ltd., 20% by mass of polyamic acid) was 50:49, and the heat treatment conditions were 350° C. under nitrogen gas (flow rate 70 L/min) for 3 hours. Except for that, an electrode was produced and evaluated in the same manner as in Comparative example 1.

Table 1 shows the 1 C capacity ratio and the average value of the capacity retention ratio after 50 cycles (unit: %, the number of measurements: 2 or more) in each example in which the heat treatment was conducted at 150° C. under atmospheric pressure in air for 1 hour. Table 2 shows the 1 C capacity ratio and the average value of the capacity retention ratio after 50 cycles (unit: %, measurement number: 2 or more) in each example in which the heat treatment was conducted at 125° C. under nitrogen gas (flow rate 70 L/min) for 1 hour.

TABLE 1

Evaluation results of electrodes treated at 150° C. (in Reference example, treated at 350° C.)

| | | Reference example 1 | Comparative example 1 | Example 1 | Example 2 | Example 3 | Example 4 |
|---|---|---|---|---|---|---|---|
| | Additive | None | None | p-hydroxy benzoic acid | p-methyl benzoic acid | m-hydroxy benzoic acid | o-hydroxy benzoic acid |
| | Amount | — | — | 0.9 | 0.9 | 0.9 | 0.9 |
| A | 1 C capacity ratio | 100 | 95 | 100 | 96 | 76 | 85 |
| B | Cycle retention ratio after 50 cycles at 25° C. | 92 | 63 | 91 | 67 | 100 | 85 |
| | A × B/100 | — | 60 | 91 | 64 | 76 | 72 |

TABLE 2

Evaluation results of electrodes treated at 125° C.
(in Reference example, treated at 350° C.)

|   |                                         | Reference example 1 | Comparative example 2 | Example 5          |
|---|-----------------------------------------|---------------------|-----------------------|--------------------|
|   | Additive                                | None                | None                  | p-hydroxybenzoic acid |
|   | Amount                                  | —                   | —                     | 2.7                |
| A | 1 C capacity ratio                      | 100                 | 100                   | 95                 |
| B | Cycle retention ratio after 50 cycles at 25° C. | 92          | 76                    | 84                 |
|   | A × B/100                               | —                   | 76                    | 80                 |

Examples 6 and 7

The examples where the additive is p-aminobenzoic acid were also confirmed. The additive was p-aminobenzoic acid, and with respect to 50:49:X, that is, the mass ratio of the composite in which the surface of $SiO_x$ having an average particle diameter D50% of 8 μm was coated with a carbon material (the amount of the carbon material in the composite was 7 mass %), the polyamic acid solution (trade name: "U-varnish A", manufactured by Ube industries, Ltd., 20% by mass of polyamic acid) and the additive, X was 0.45 or 0.20. Except for that, electrodes were produced and evaluated in the same manner as in Examples 1 to 4 in which the heat treatment was conducted at 150° C. under atmospheric pressure in air for 1 hour. Table 3 shows the 1 C capacity ratios and the average values of the capacity retention ratio after 50 cycles (unit: %, the number of measurements: 2 or more) of these examples.

TABLE 3

Effect of addition amount of p-aimnobenzoic acid in electrode treated at 150° C.

|   |                                         | Reference example 1 | Comparative example 1 | Example 6          | Example 7          |
|---|-----------------------------------------|---------------------|-----------------------|--------------------|--------------------|
|   | Additive                                | None                | None                  | p-aminobenzoic acid | p-aminobenzoic acid |
|   | Amount                                  | —                   | —                     | 0.45               | 0.20               |
| A | 1 C capacity ratio                      | 100                 | 95                    | 98                 | 98                 |
| B | Cycle retention ratio after 50 cycles at 25° C. | 92          | 63                    | 69                 | 77                 |
|   | A × B/100                               | —                   | 60                    | 67                 | 75                 |

Examples 8 to 10

In these examples, the additive was p-hydroxybenzoic acid, and the effect of the addition amount of p-hydroxybenzoic acid was confirmed. With respect to 50:49:X, that is, the mass ratio of the composite in which the surface of $SiO_x$ having an average particle diameter D50% of 8 μm was coated with a carbon material (the amount of the carbon material in the composite was 7 mass %), the polyamic acid solution (trade name: "U-varnish A", manufactured by Ube industries, Ltd., 20% by mass of polyamic acid) and the additive, the examples where X was reduced from 0.9 to 0.23 or 0.10 and the example where X was increased to 4.4 were conducted. Except for that, electrodes were produced and evaluated in the same manner as in Examples 1 to 4 in which the heat treatment was conducted at 150° C. under atmospheric pressure in air for 1 hour. Table 4 shows the 1 C capacity ratios and the average values of the capacity retention ratio after 50 cycles (unit: %, the number of measurements: 2 or more) of these examples.

TABLE 4

Effect of addition amount of p-hydroxybenzoic acid in electrode treated at 150° C.

|   |                                         | Reference example 1 | Comparative example 1 | Example 8 | Example 1 | Example 9 | Example 10 |
|---|-----------------------------------------|---------------------|-----------------------|-----------|-----------|-----------|------------|
|   | Additive                                | None                | None                  | p-hydroxybenzoic acid | p-hydroxybenzoic acid | p-hydroxybenzoic acid | p-hydroxybenzoic acid |
|   | Amount                                  | —                   | —                     | 4.4       | 0.9       | 0.23      | 0.10       |
| A | 1 C capacity ratio                      | 100                 | 95                    | 71        | 100       | 96        | 81         |
| B | Cycle retention ratio after 50 cycles at 25° C. | 92          | 63                    | 96        | 91        | 89        | 79         |
|   | A × B/100                               | —                   | 60                    | 68        | 91        | 85        | 64         |

There was a correlation between the substituents of the benzoic acids that is the additive and the capacity of the silicon electrode after 50 cycles (A x B in the tables). That is, the electron donating groups are effective in improving the capacity of the silicon electrodes. This effect was exerted not only by the treatment at 150° C. under atmospheric pressure in air but also by the treatment at 125° C. under nitrogen gas as shown in Table 2. In addition, the capacity after 50 cycles of the silicon electrode may be further improved by setting the addition amount of the benzoic acid derivative within a specific range in some cases.

Example 11

Electrode with Insulation Coating Treated at Low Temperature

A composite in which the surface of $SiO_x$ having an average particle diameter D50% of 8 μm was coated with a carbon material (the amount of the carbon material in the composite was 7 mass %), a polyamic acid solution (trade name: "U-varnish A", manufactured by Ube industries, Ltd., 20% by mass of polyamic acid), and an additive were respectively weighed at a mass ratio of 50:49:0.9. These were mixed with N-methylpyrrolidone (NMP) to give a slurry. The amount of water in the slurry was 200 to 300 ppm. The slurry was applied on a copper foil having a thickness of 10 μm by using a doctor blade. Thereafter, the resultant was heated at 120° C. for 5 minutes for drying the NMP.

Then, alumina having an average particle diameter D50% of 0.7 μm and polyvinylidene fluoride (PVDF) were weighed at a mass ratio of 80:20. These were mixed with NMP to give a slurry. The slurry was applied on the above mentioned electrode by using a doctor blade. Thereafter, the resultant was heated at 120° C. for 5 minutes for drying the NMP.

Then, the resultant was heated at 150° C. under atmospheric pressure in air for 1 hour. This copper film on which an active material layer has been formed was stamped into a circular shape having a diameter of 12 mm to produce an electrode.

Using this electrode, a model cell was produced and the evaluation after 50 cycles was conducted in the same manner as in Example 1. As a result, the 1 C capacity ratio was 100, the capacity retention ratio after 50 cycles at 25° C. was 91(%), which were the same values as in Example 1.

Comparative Example 3

Electrode with Insulation Coating Treated at High Temperature

A composite in which the surface of $SiO_x$ having an average particle diameter D50% of 8 μm was coated with a carbon material (the amount of the carbon material in the composite was 7 mass %), and a polyamic acid solution (trade name: "U-varnish A", manufactured by Ube industries, Ltd., 20% by mass of polyamic acid) were respectively weighed at a mass ratio of 50:49. These were mixed with N-methylpyrrolidone (NMP) to give a slurry. The amount of water in the slurry was 200 to 300 ppm. The slurry was applied on a copper foil having a thickness of 10 μm by using a doctor blade. Thereafter, the resultant was heated at 120° C. for 5 minutes for drying the NMP.

Then, alumina having an average particle diameter D50% of 0.7 μm and PVDF were weighed at a mass ratio of 80:20. These were mixed with NMP to give a slurry. The slurry was applied on the above mentioned electrode by using a doctor blade. Thereafter, the resultant was heated at 120° C. for 5 minutes for drying the NMP.

Then, the resultant was heated at 350° C. under nitrogen gas (flow rate 70 L/min) for 3 hours. This copper film on which an active material layer has been formed was stamped into a circular shape having a diameter of 12 mm to produce an electrode.

Using this electrode, a model cell was produced in the same manner as in Example 1, but charging and discharging could not be performed because the ionic conductivity was low due to the esoftening and aggregation of PVDF in the insulating layer.

Comparative Example 4

Electrode with Insulation Coating Treated at Low Temperature in the Case of not Using Additive A composite in which the surface of $SiO_x$ having an average particle diameter D50% of 8 μm was coated with a carbon material (the amount of the carbon material in the composite was 7 mass %) and a polyamic acid solution (trade name: "U-varnish A", manufactured by Ube industries, Ltd., 20% by mass of polyamic acid) were respectively weighed at a mass ratio of 50:49. These were mixed with N-methylpyrrolidone (NMP) to give a slurry. The amount of water in the slurry was 200 to 300 ppm. The slurry was applied on a copper foil having a thickness of 10 μm by using a doctor blade. Thereafter, the resultant was heated at 120° C. for 5 minutes for drying the NMP. Then, the resultant was heated at 150° C. under atmospheric pressure in air for 1 hour.

Then, alumina having an average particle diameter D50% of 0.7 μm and PVDF were weighed at a mass ratio of 80:20. These were mixed with NMP to give a slurry. The slurry was applied on the above mentioned electrode by using a doctor blade. Thereafter, the resultant was heated at 120° C. for 5 minutes for drying the NMP. This copper film on which an active material layer has been formed was stamped into a circular shape having a diameter of 12 mm to produce an electrode.

Using this electrode, a model cell was produced and the evaluation after 50 cycles was conducted in the same manner as in Example 1. As a result, the 1 C capacity ratio was 95, the capacity retention ratio after 50 cycles at 25° C. was 63(%), which were the same values as in Comparative example 1.

Since the aromatic compound comprising an electron donating group and an organic acid group can promote the imidization reaction at low temperature, as shown in Example 11, it is possible to conduct the drying for solvents of the electrode having the insulation layer comprising a binder such as PVDF or SBR, having a heat resisting temperature below 350° C., and the imidization of the mixture layer consecutively or simultaneously. In the case of the actual large-scale production, also, when the mixture layer and the insulation layer are applied simultaneously or consecutively, followed by performing the heating process for drying out NMP solvent in these two layers and the heating process for imidizing the polyamic acid in the mixture layer consecutively or simultaneously, the production efficiency is very high. In contrast, as shown in Comparative example 3, when the aromatic compound comprising an electron donating group and an organic acid group is not added, since 350° C. is necessary to imidize the mixture layer, the heat treatment cost increases and the production efficiency decreases. Not only that, the binder of the insulation layer melts and the gap disappears, and thereby, charging and discharging also become impossible. When a binder having a low decomposition point is used or when the imidizing temperature is high, especially in the case of the heat treatment in air, the binder disappears due to a thermal decomposition reaction and the insulation layer itself cannot be formed. In Comparative example 4, since the polyamic acid not comprising the aromatic compound was imidized by the heat treatment at a low temperature of 150° C., not only the productivity but also the properties such as the 1 C capacity ratio and the capacity retention ratio were degraded.

Comparative Example 5

Except for changing the additive from p-hydroxybenzoic acid to benzoic acid, an electrode was produced and evaluated in the same manner as in Example 1. As a result, the 1 C capacity ratio (A in Table 1) was 44, the capacity retention ratio after 50 cycles at 25° C. (B in the table) was 135%, and A×B/100 was 59.

TABLE 5

Evaluation results of electrode treated at 150° C.
(in Reference example, treated at 350° C.)

| | | Reference example 1 | Comparative example 5 |
|---|---|---|---|
| | Additive | None | Benzoic acid |
| | Amount | — | 0.9 |
| A | 1 C capacity ratio | 100 | 44 |
| B | Cycle retention ratio after 50 cycles at 25° C. | 92 | 135 |
| | A × B/100 | — | 59 |

As shown in Comparative example 5, since the initial capacity (A in the table) decreases when there is no substituent on the aromatic ring of benzoic acid, it is preferred that a substituent is present thereon. The reason why the capacity retention ratio exceeded 100% is because a larger amount of Li than the capacity of the trial electrode was supplied from the Li metal of the counter electrode containing a larger amount of Li than the capacity of the trial electrode during the cycles. Therefore, in the case of using a counter electrode containing a smaller amount of Li than the capacity of the electrode of the present invention, it is presumable that the capacity retention ratio decreases.

Example 12 and Comparative Example 6

The binder was changed to Polyamic acid solution 2 shown below to evaluate the properties of the electrode.

Preparation of Polyamic Acid Solution 2

0.9 L of water that is a solvent and 0.20 mol of 4,4'-diaminodiphenyl ether that is a diamine component were charged into a 4-necked flask equipped with a cooling tube and a nitrogen inlet, 0.51 mol of 1,2-dimetyl imidazole was charged there, and then, the resultant was stirred for 1 hour at 25° C. to dissolve them. To this solution, 0.20 mol of 3,3',4,4'-biphenyltetracarboxylic dianhydride was added, and then, the resultant was stirred for 4 hours at 70° C. to prepare Polyamic acid solution 2 containing 8 mass % of a polyamic acid.

Production of Electrode

A composite in which the surface of $SiO_x$ having an average particle diameter D50% of 8 μm was coated with a carbon material (the amount of the carbon material in the composite was 7 mass %), Polyamic acid solution 2 (8% by mass of a polyamic acid), and an additive, p-hydroxybenzoic acid were respectively weighed at a mass ratio of 50:122:X. X was set to 0.9 in Example 12, and X was set to 0 in Comparative example 6. These were kneaded to give a slurry. The slurry was applied on a copper foil having a thickness of 10 μm by using a doctor blade. Thereafter, the resultant was heated at 100° C. for 10 minutes. Then, the resultant was heated at 150° C. under reduced pressure. This copper film on which an active material layer has been formed was stamped into a circular shape having a diameter of 12 mm to produce an electrode.

Production of Battery

The produced electrode was layered with a counter electrode of Li metal via an olefinic separator to produce a model cell with EC/DEC/EMC=3/5/2 (the volume ratio) containing 1 M of $LiPF_6$ as an electrolyte solution.

Evaluation of Battery

A charge and discharge test and a cycle test of the produced model cell were performed at 25° C. In the charge and discharge test, charge and discharge were performed twice in a current density of 0.3 mA/cm$^2$ in a voltage range of 0.03 to 1.0 V. The quantity of electricity flowed from the start until the end of charging or discharging was defined as the charge capacity or the discharge capacity, and the second charge capacity (corresponding to the amount of lithium desorption from the silicon-based electrode) was defined as 1 C. The 1 C capacity per mass of the $SiO_x$ composite of the electrode (Reference example 2) treated at 250° C. for 2 hours and not comprising the additive such as p-hydroxy benzoic acid was set to 100, and thereby, the 1 C capacity ratio of the electrodes were determined.

In the cycle test, the model cells after the charge and discharge test were used, and a cycle including discharging at 0.3 C to 1.0 V and carrying out constant voltage discharge for 4 hours in total and then carrying out constant current charge at 0.3 C to 0.03 V was repeated 50 times. The proportion of the discharge capacity after 50 cycles to the initial discharge capacity (corresponding to the amount of lithium desorption from the silicon-based electrode) was determined as the capacity retention ratio.

Reference Example 2

The mass ratio of the composite in which the surface of $SiO_x$ having an average particle diameter D50% of 8 μm was coated with a carbon material (the amount of the carbon material in the composite was 7 mass %) and Polyamic acid solution 2 (8% by mass of a polyamic acid) was 50:122, and the heat treatment conditions after the heating at 100° C. for 10 minutes were 250° C. under nitrogen gas (flow rate 70 L/min) for 2 hours. Except for that, an electrode was produced and evaluated in the same manner as in Comparative example 6.

Table 6 shows the 1 C capacity ratios and the average values of the capacity retention ratio after 50 cycles (unit: %, the number of measurements: 2 or more) in each example.

TABLE 6

Evaluation results of electrodes treated at 150° C.
(in Reference example, treated at 250° C.)

|   |   | Reference example 2 | Comparative example 6 | Example 12 |
|---|---|---|---|---|
|   | Additive | None | None | p-hydroxy benzoic acid |
|   | Amount | — | — | 0.9 |
| A | 1 C capacity ratio | 100 | 89 | 93 |
| B | Cycle retention ratio after 50 cycles at 25° C. | 87 | 61 | 85 |
|   | A × B/100 | — | 54 | 79 |

Example 13 and Comparative Example 7

The binder was changed to Polyamic acid solution 3 shown below to evaluate the properties of the electrode.

Preparation of Polyamic Acid Solution 3

0.40 L of N,N-dimethylacetamide as an organic solvent and 0.10 mol of 1,4-diaminocyclohexane and 0.10 mol of 1,4-bis(aminomethyl)cyclohexane (trans ratio 84%) as a diamine component were charged into a 4-necked flask equipped with a cooling tube and a nitrogen inlet tube under stirring. Further, under stirring conditions, 0.20 mol of 3,4'-oxydiphthalic anhydride was charged thereto, and then, the obtained liquid was allowed to react while keeping the flask in an oil bath kept at 90° C. for 1 hour to obtain Polyamic acid solution 3 containing 15 mass % of a polyamic acid.

Production of Electrode

A composite in which the surface of $SiO_x$ having an average particle diameter D50% of 8 μm was coated with a carbon material (the amount of the carbon material in the composite was 7 mass %), Polyamic acid solution 3 (15% by mass of polyamic acid), and an additive, p-toluic acid were respectively weighed at a mass ratio of 50:33:X. X was set to 0.23 in Example 13, and X was set to 0 in Comparative example 7. These were kneaded with N-methylpyrrolidone (NMP) to give a slurry. The amount of water in the slurry was 200 to 300 ppm. The slurry was applied on a copper foil having a thickness of 10 μm by using a doctor blade. Thereafter, the resultant was heated at 120° C. for 5 minutes to dry out the solvent. Then, the resultant was heated at 130° C. under reduced pressure for 30 minutes. This copper film on which an active material layer has been formed was stamped into a circular shape having a diameter of 12 mm to produce an electrode.

Production of Battery

The produced electrode was layered with a counter electrode of Li metal via an olefinic separator to produce a model cell with EC/DEC/EMC=3/5/2 (the volume ratio) containing 1 M of $LiPF_6$ as an electrolyte solution.

Evaluation of Battery

A Charge and discharge test and a cycle test of the produced model cells were performed at 25° C. In the charge and discharge test, charge and discharge were performed twice in a current density of 0.3 mA/cm² in a voltage range of 0.03 to 1.0 V. The quantity of electricity flowed from the start until the end of charging or discharging was defined as the charge capacity or the discharge capacity, and the second charge capacity (corresponding to the amount of lithium desorption from the silicon-based electrode) was defined as 1 C. 1 C capacity per mass of the $SiO_x$ composite of the electrode (Reference example 3) treated at 270° C. for 2 hours and not comprising the additive such as p-hydroxybenzoic acid was set to 100, and thereby, the 1 C capacity ratio of the electrodes were determined.

In the cycle test, the model cells after the charge and discharge test were used, and a cycle including discharging at 0.3 C to 1.0 V and carrying out constant voltage discharge for 4 hours in total and then carrying out constant current charge at 0.3 C to 0.03 V was repeated 50 times. The proportion of the discharge capacity after 50 cycles to the initial discharge capacity (corresponding to the amount of lithium desorption from the silicon-based electrode) was determined as the capacity retention ratio.

Reference Example 3

The mass ratio of the composite in which the surface of $SiO_x$ having an average particle diameter D50% of 8 μm was coated with a carbon material (the amount of the carbon material in the composite was 7 mass %) and Polyamic acid solution 3 (15% by mass of polyamic acid) was 50:33, and the heat treatment conditions were 270° C. under nitrogen gas (flow rate 70 L/min) for 2 hours. Except for that, an electrode was produced and evaluated in the same manner as in Comparative example 7.

Table 7 shows the 1 C capacity ratios and the average values of the capacity retention ratio after 50 cycles (unit: %, the number of measurements: 2 or more) in each example.

TABLE 7

Evaluation results of electrodes treated at 130° C.
(in Reference example, treated at 270° C.)

|   |   | Reference example 3 | Comparative example 7 | Example 13 |
|---|---|---|---|---|
|   | Additive | None | None | p-toluic acid |
|   | Amount | — | — | 0.23 |
| A | 1 C capacity ratio | 100 | 92 | 87 |
| B | Cycle retention ratio after 50 cycles at 25° C. | 76 | 67 | 78 |
|   | A × B/100 | — | 61 | 68 |

Example 14 and Comparative Example 8

The binder was changed to Polyamic acid solution 4 shown below to evaluate the properties of the electrode.

Preparation of Polyamic Acid Solution 4

0.61 L of N,N-dimethylacetamide as a polymerization solvent and 0.70 mol of 4,4'-diaminodiphenyl methane as a diamine component were charged into a 4-necked flask equipped with a cooling tube and a nitrogen inlet tube, and the solution was stirred to dissolve the diamine component completely. Next, 0.70 mol of trimellitic anhydride chloride was gradually added such that the temperature of the polymerization solution does not exceed 30° C., and after completion of the addition, the temperature was adjusted to 30° C. and the polymerization solution was stirred and allowed to react for 1 hour. Then, the polymerization solution was diluted with N-methyl-2-pyrrolidone such that the solid concentration was 10%, to obtain Polyamic acid solution 4.

Production of Electrode

A composite in which the surface of $SiO_x$ having an average particle diameter D50% of 8 μm was coated with a carbon material (the amount of the carbon material in the composite was 7 mass %), a polyamideimide raw material, Polyamic acid solution 4 (10% by mass of a polyamic acid), and an additive, p-hydroxy benzoic acid were respectively weighed at a mass ratio of 50:50:X. X was set to 0.23 in Example 14, and X was set to 0 in Comparative example 8. These were kneaded with N-methylpyrrolidone (NMP) to give a slurry. The amount of water in the slurry was 200 to 300 ppm. The slurry was applied on a copper foil having a thickness of 10 μm by using a doctor blade. Thereafter, the resultant was heated at 120° C. for 5 minutes to dry out the solvent. Then, the resultant was heated at 130° C. under reduced pressure for 30 minutes. This copper film on which an active material layer has been formed was stamped into a circular shape having a diameter of 12 mm to produce an electrode.

Production of Battery

The produced electrode was layered with a counter electrode of Li metal via an olefinic separator to produce a model cell with EC/DEC/EMC=3/5/2 (the volume ratio) containing 1 M of $LiPF_6$ as an electrolyte solution.

Evaluation of Battery

A charge and discharge test and a cycle test of the produced model cells were performed at 25° C. In the charge and discharge test, charge and discharge were performed twice in a current density of 0.3 mA/cm$^2$ in a voltage range of 0.03 to 1.0 V. The quantity of electricity flowed from the start until the end of charging or discharging was defined as the charge capacity or the discharge capacity, and the second charge capacity (corresponding to the amount of lithium desorption from the silicon-based electrode) was defined as 1 C. 1 C capacity per mass of the $SiO_x$ composite of the electrode (Reference example 4) treated at 250° C. for 30 minutes and not comprising the additive such as p-hydroxybenzoic acid was set to 100, and thereby, the 1 C capacity ratio of the electrodes were determined.

In the cycle test, the model cells after the charge and discharge test were used, and a cycle including discharging at 0.3 C to 1.0 V and carrying out constant voltage discharge for 4 hours in total and then carrying out constant current charge at 0.3 C to 0.03 V was repeated 50 times. The proportion of the discharge capacity after 50 cycles to the initial discharge capacity (corresponding to the amount of lithium desorption from the silicon-based electrode) was determined as the capacity retention ratio.

Reference Example 4

The mass ratio of the composite in which the surface of $SiO_x$ having an average particle diameter D50% of 8 μm was coated with a carbon material (the amount of the carbon material in the composite was 7 mass %) and a polyamideimide raw material, Polyamic acid solution 4 (10% by mass of a polyamic acid) was 50:50, and the heat treatment conditions were 250° C. under nitrogen gas (flow rate 70 L/min) for 30 minutes. Except for that, an electrode was produced and evaluated in the same manner as in Comparative example 8.

Table 8 shows the 1 C capacity ratios and the average values of the capacity retention ratio after 50 cycles (unit: %, the number of measurements: 2 or more) in each example.

TABLE 8

Evaluation results of electrodes treated at 130° C.
(in Reference example, treated at 250° C.)

|   |   | Reference example 4 | Comparative example 8 | Example 14 |
|---|---|---|---|---|
|   | Additive | None | None | p-hydroxy benzoic acid |
|   | Amount | — | — | 0.23 |
| A | 1 C capacity ratio | 100 | 93 | 91 |
| B | Cycle retention ratio after 50 cycles at 25° C. | 66 | 53 | 66 |
|   | A × B/100 | — | 49 | 60 |

It was found from the above examples that even if the imidization is conducted at low temperature, a high capacity battery can be obtained when the polyimide binder comprising the aromatic compound comprising the electron donating group and the organic acid group is used.

This application is based upon and claims the benefit of priority from Japanese patent application No. 2015-184530, filed on Sep. 17, 2015, and Japanese patent application No. 2015-219948, filed on Nov. 9, 2015, the disclosure of which is incorporated herein in its entirety by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The secondary battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

The invention claimed is:

1. A secondary battery electrode, comprising:
    a current collector; and
    an active material layer on a surface of the current collector, the active material layer comprising:
        particles of active material for the secondary battery electrode, and
        a polyimide binder obtained by heating a resin composition comprising a polyamic acid, and an aromatic compound comprising a first substituent that is an electron donating group and a second substituent that is an organic acid group,
    wherein the particles of active material are bound mutually by the polyimide binder,
    wherein the electron donating group is selected from the group consisting of alkyl group, alkoxy group, amino group, hydroxyl group, mercapto group, and alkylthio group, and
    wherein the organic acid group is selected from carboxyl group, sulfo group, and phosphate group.

2. The electrode according to claim 1, wherein the organic acid group is a carboxyl group.

3. The electrode according to claim 1, wherein the electron donating group is selected from the group consisting of alkyl group and hydroxyl group.

4. The electrode according to claim 1, wherein the aromatic compound is a benzene in which hydrogens of an aromatic ring have been substituted with the electron donating group and the organic acid group.

5. The electrode according to claim 4, wherein the aromatic compound has the electron donating group at para position with respect to the organic acid group.

6. The electrode according to claim 1, wherein the aromatic compound is a hydroxybenzoic acid.

7. The electrode according to claim 1, wherein an amount of the polyimide is 0.5 to 50 parts by mass when an amount of the active material is 100 parts by mass.

8. The electrode according to claim 1, comprising an insulation layer applied on a surface of the electrode.

9. A secondary battery comprising the electrode of claim 1.

10. The electrode according to claim 1, comprising the aromatic compound in an amount of 20 mass % or less when an entire mass of the resin composition is considered 100 mass %.

11. The electrode according to claim 1, comprising the aromatic compound in an amount of 1 to 9 mass % when an entire mass of the resin composition is considered 100 mass %.

12. The electrode according to claim 1, wherein the electron donating group is alkyl group.

13. The electrode according to claim 1, wherein the particles of active material are Si coated with carbon or silicon oxide coated with carbon.

14. A method of producing the electrode according to claim 1, the method comprising:
    a step of mixing the resin composition, the particles of active material and a solvent to prepare an electrode mixture paste for a secondary battery,
    a step of applying the electrode mixture paste for a secondary battery on the surface of the current collector, and
    a step of heat-treating the current collector coated with the electrode mixture paste for a secondary battery at a temperature of 150° C. or lower to convert the polyamic acid to a polyimide.

15. The method according to claim 14, wherein the particles of active material are Si coated with carbon and/or silicon oxide coated with carbon.

16. A method of producing an electrode having an insulation layer comprising:
    a step of forming an insulation layer on the electrode according to claim 1, and
    a step of heat-treating the insulation layer and the electrode mixture layer simultaneously.

17. The electrode according to claim 1, wherein the active material is a material capable of reversibly intercalating and deintercalating lithium ions according to charge and discharge.

18. The electrode according to claim 17, wherein the particles of active material are composite particles of Si coated with carbon or composite particles of silicon oxide coated with carbon.

19. The electrode according to claim 18, wherein an amount of the polyimide is 0.5 to 50 parts by mass when an amount of the active material is 100 parts by mass.

20. The electrode according to claim 19, comprising the aromatic compound in an amount of 1 to 20 mass % when an entire mass of the resin composition is considered 100 mass %.

* * * * *